United States Patent
Yannier et al.

(10) Patent No.: US 10,163,369 B2
(45) Date of Patent: Dec. 25, 2018

(54) APPARATUS AND METHODS FOR TANGIBLE COLLABORATIVE LEARNING

(71) Applicant: CARNEGIE MELLON UNIVERSITY, a Pennsylvania Non-Profit Corporation, Pittsburgh, PA (US)

(72) Inventors: Nesra Yannier, Pittsburgh, PA (US); Kenneth R. Koedinger, Pittsburgh, PA (US); Scott E. Hudson, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 323 days.

(21) Appl. No.: 14/734,938

(22) Filed: Jun. 9, 2015

(65) Prior Publication Data

US 2016/0049095 A1    Feb. 18, 2016

Related U.S. Application Data (60) Provisional application No. 61/997,772, filed on Jun. 9, 2014.

(51) Int. Cl.
  *G09B 23/06* (2006.01)
  *G09B 23/10* (2006.01)
  (Continued)

(52) U.S. Cl.
  CPC ............ *G09B 23/10* (2013.01); *G09B 7/02* (2013.01); *G09B 7/06* (2013.01)

(58) Field of Classification Search
  CPC .......... G09B 23/06–23/10; G09B 7/06; G01M 7/00–7/08
  See application file for complete search history.

(56) References Cited

U.S. PATENT DOCUMENTS

| | | | | | |
|---|---|---|---|---|---|
| 5,601,433 | A | * | 2/1997 | Potter | G09B 9/00 434/130 |
| 5,813,865 | A | * | 9/1998 | Greenbowe | G09B 19/0069 345/473 |

(Continued)

OTHER PUBLICATIONS

Center for the Digital Future. The 2009 digital future report: Surveying the digital future year eight. Los Angeles: USC Annenberg School Center for the Digital Future.

(Continued)

*Primary Examiner* — Peter Egloff
(74) *Attorney, Agent, or Firm* — Michael G. Monyok; David G. Oberdick (57) ABSTRACT

The present invention relates generally to a system and method that bring together the advantages of computer games and the physical world to increase engagement, collaboration and learning. The system and method can be used with a myriad of physical setups and can be used for many different content areas in education. In one embodiment, a mixed reality interaction is facilitated with an EarthShake™ game presented on a display. The game is synchronized with a tangible interface comprising a physical object and a sensor capable of detecting a change in the condition of the physical object. The system and method help kids discover scientific and other learning principles while experimenting with real objects in a physical environment supported with audio and visual feedback. Students interactively make predictions, see results, grapple with disconfirming evidence and formulate explanations in forms of general principles.

11 Claims, 4 Drawing Sheets

(51) Int. Cl.
*G09B 7/02* (2006.01)
*G09B 7/06* (2006.01)

(56) References Cited

U.S. PATENT DOCUMENTS

| | | | | | |
|---|---|---|---|---|---|
| 6,341,258 | B1* | 1/2002 | Inoue | ............ | G01M 7/022 |
| | | | | | 702/33 |
| 6,529,705 | B1* | 3/2003 | Keller | ............ | G09B 23/06 |
| | | | | | 434/118 |
| 6,813,473 | B1* | 11/2004 | Bruker | ............ | G09B 7/02 |
| | | | | | 434/118 |
| 7,997,130 | B1* | 8/2011 | Stonner | ............ | G01M 9/04 |
| | | | | | 73/147 |
| 2003/0124500 | A1* | 7/2003 | Frankenberry | ............ | G09B 5/00 |
| | | | | | 434/311 |
| 2006/0046236 | A1* | 3/2006 | Peng | ............ | G09B 23/10 |
| | | | | | 434/322 |
| 2008/0233550 | A1* | 9/2008 | Solomon | ............ | G09B 9/02 |
| | | | | | 434/276 |
| 2010/0221692 | A1* | 9/2010 | Lally | ............ | G09B 23/08 |
| | | | | | 434/302 |
| 2014/0349267 | A1* | 11/2014 | Thornton | ............ | G09B 23/02 |
| | | | | | 434/276 |
| 2016/0217700 | A1* | 7/2016 | Zimmer | ............ | G09B 5/08 |

OTHER PUBLICATIONS

Christel, Michael G., et al. "RumbleBlocks: Teaching science concepts to young children through a Unity game." Computer Games (CGAMES), 2012 17th International Conference on. IEEE, 2012.

Fitzmaurice, G.W. et al. "Bricks: laying the foundations for graspable user interfaces." In Proceedings of the SIGCHI conference on Human factors in computing systems, pp. 442-449. ACM Press/Addison-Wesley Publishing Co., 1995.

Henning, P. "Everyday cognition and situated learning." Handbook of research for educational communications and technology: A project of the Association for Educational Communications and Technology (2nd) (2004): 143-168.

Jackson, G. T., et al. "Short and long term benefits of enjoyment and learning within a serious game." In Artificial Intelligence in Education, pp. 139-146. Springer Berlin Heidelberg, 2011.

Johnson, W.L., et al. "Serious games for language learning: How much game, how much AI?." In AIED, vol. 125, pp. 306-313. 2005.

McQuiggan, S., et al. "Story-based learning: The impact of narrative on learning experiences and outcomes." In Intelligent tutoring systems, pp. 530-539. Springer Berlin Heidelberg, 2008.

Schweingruber, H. et al., "A Framework for K-12 Science Education: Practices, Crosscutting Concepts, and Core Ideas." The National Academies Press, (2012).

O'Malley, C. et al. "Literature review in learning with tangible technologies." Nesta FutureLab Series, report 12, (2004).

Prensky, M., "Digital game-based learning." Computers in Entertainment (CIE) 1, No. 1 (2003): 21-21.

Roe, K., et al. "Children and computer games a profile of the heavy user." European Journal of communication 13, No. 2 (1998): 181-200.

Schneider, B., et al. "Benefits of a tangible interface for collaborative learning and interaction." Learning Technologies, IEEE Transactions on 4, No. 3 (2011): 222-232.

Walker, E. "Using need validation to design an intelligent tangible learning environment." In CHI 2012 Extended Abstracts on Human Factors in Computing Systems, pp. 2123-2128. ACM, 2012.

Yannier, N. et al. "Using haptics to convey cause-and-effect relations in climate visualization." Haptics, IEEE Transactions on 1, No. 2 (2008): 130-141.

* cited by examiner

APPARATUS AND METHODS FOR TANGIBLE COLLABORATIVE LEARNING

CROSS-REFERENCE TO RELATED APPLICATIONS

This application claims the benefit under 35 U.S.C. § 119 of U.S. Provisional Application Ser. No. 61/997,772, filed Jun. 9, 2014, which is incorporated by reference herein in its entirety.

STATEMENT REGARDING FEDERALLY SPONSORED RESEARCH

This invention was made with government support under DARPA No. ONR N00014-12-C-0284 and LearnLab (NSF grant SBE-0836012). The government has certain rights in this invention.

BACKGROUND OF THE INVENTION

The invention relates generally to a system and method for tangible collaborative learning. More specifically, the invention relates to a system and method of learning that uses both physical objects and a virtual representation of those objects to combine the benefits of a tangible interface and digital technologies to promote learning.

Children are often attracted to computer games and other digital technologies. Modern computer games show potential for engaging and entertaining users while also promoting learning through the use of feedback mechanisms. Computer games have also been demonstrated to have motivational benefits with their compelling narratives as well as providing long term learning gains. However, the computer also has a tendency to pull people away from their physical environment and make them physically and socially isolated. Researchers have shown that family time has decreased by more than thirty percent due to computer usage at home.

On the other hand, the physical environment can help children play, discover, experiment and learn together in an engaging way without some of the drawbacks associated with computer games. In addition, young children are highly attracted to sensory development apparatuses and they use physical materials spontaneously, independently, and repeatedly with deep concentration. Theories of embodied cognition and situated learning have also shown that mind and body are deeply integrated in the process of producing learning and reasoning.

Tangible interfaces for computers can help learning because they encourage sensory engagement, active manipulation and physical activity. Some research suggests that tangible interfaces allow for more parallel input specification by the user, thereby improving the expressiveness or the communication capacity of the computer. Tangible interfaces also take advantage of well-developed, everyday skills for physical object manipulations and spatial reasoning, externalize traditionally internal computer representations and afford multi-person collaborative use. Tangible interfaces bringing together physical and virtual objects can help people perform a task better and achieve a higher learning gain than screen-based multi-touch surface alone, for example.

Some systems exist that use embedded sensors in objects or require manipulation of physical objects to pre-defined spaces in an attempt to provide tangible interfaces for computers. While these systems show promise, they are limited by high costs or experimentation constraints. Also, most of these systems are based on pure exploration, rather than providing a pedagogically strong learning experience to the users. It would therefore be advantageous to develop a system and method for learning using a mixed reality environment that combines the benefits of both digital technology and physical objects that can be manipulated in a traditional manner, allowing for an improved hands-on learning experience with pedagogical supports such as guided personalized feedback and self-explanation.

BRIEF SUMMARY OF THE INVENTION

According to embodiments of the present disclosure is a system and method for tangible collaborative learning. In some embodiments, the system comprises a physical object that can be manipulated by a user, a sensor for gathering information about a condition of the physical object, and a computer that interprets the information and displays the physical object as a virtual representation on a display screen. In these embodiments, the computer is able to determine when an event has occurred in the physical space, such as when a tower of blocks collapses from a shaking table, for example.

The system brings together the advantages of computer games—engaging characters, fantasy settings, compelling scenarios, guided experimentation, and immediate feedback—with the advantages of the physical environment—tangible learning, face to face social interaction, collaboration, physical experimentation and discovery—for better learning and increased human-human social interaction.

DETAILED DESCRIPTION OF THE INVENTION

Figure 1:
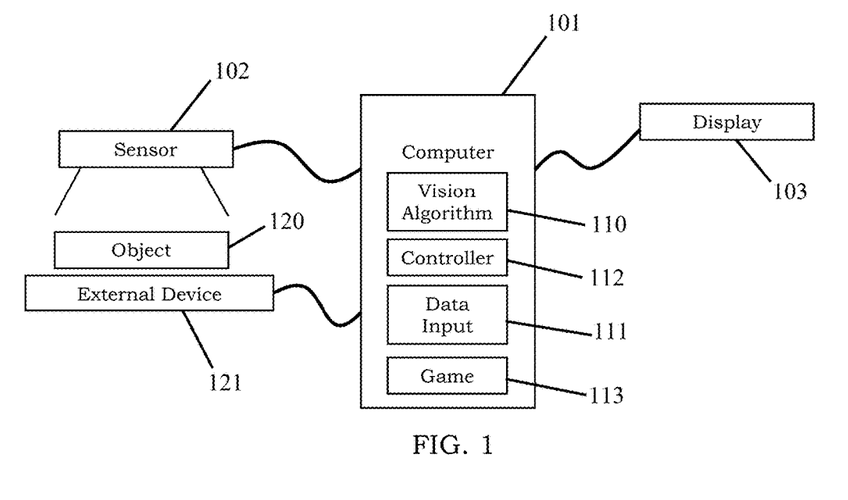
FIG. 1 is a block diagram showing components of the system according to one embodiment.

Embodiments of the present invention and its advantages are best understood by referring to FIGS. 1-4. FIG. 1 is a block diagram of the system according to one embodiment. The embodiment shown in FIG. 1 comprises a computer 101, a sensor 102 connected to the computer 101, and a display 103 also connected to the computer 101. When the sensor 102 is a camera, the computer contains a vision algorithm 110 that processes data from the sensor 102 to determine a condition or property of a physical object 120. In turn, the computer 101 sends a virtual representation of the physical object 120 to the display 103. Other sensors 102 such as stereo depth cameras, color cameras, scales, thermometers, and various gauges can be used if capable of sensing a change in the condition of the object 120. When sensors 102 other than a camera are used, the algorithm 110 is configured to detect the change.

The computer 101 can also include a data input interface 111 for receiving communications from a user of the system.

The user interacts with the system through a series of prompts shown on the display 103. Alternatively, interaction can occur through a game 113 run on the computer 101 and shown on the display 103, which can be a computer screen, tablet screen, projector, or similar device. Further included is a controller 112 that can be used to manipulate the physical object 120 through an optional external device 121. For example, in one embodiment, the physical object 120 is a tower of blocks or a group of towers and the external device 121 is a table or surface that is capable of being shaken, causing one or more of the towers to topple.

Figure 4A:
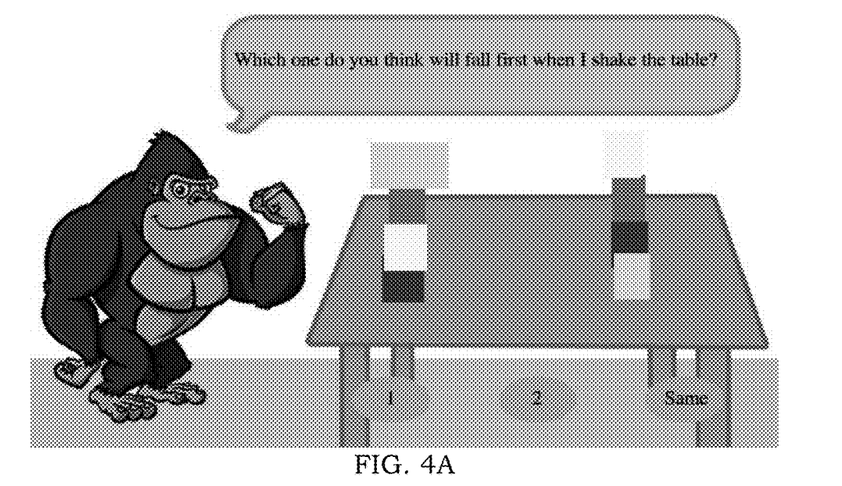
FIGS. 4A-4C are representations of various images presented to a user during the game, including soliciting a prediction, asking for a hypothesis, and providing an explanation.
Figure 4B:
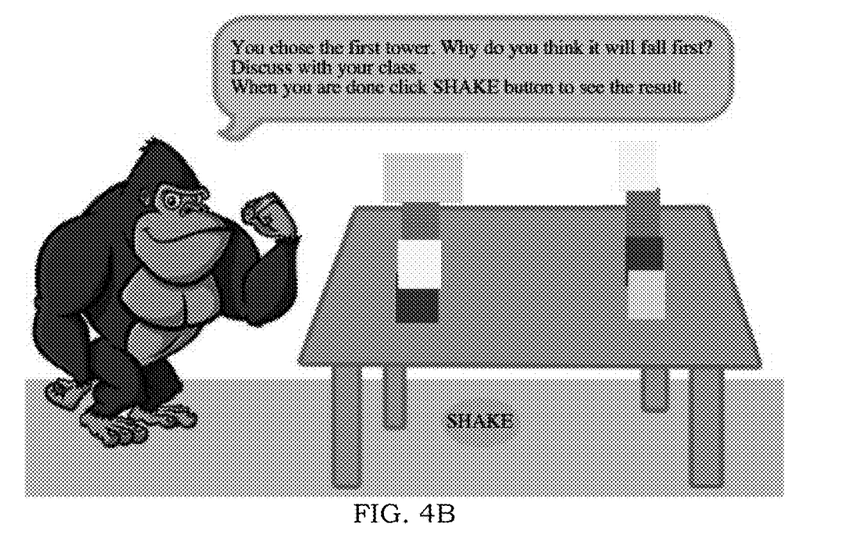
Figure 4C:
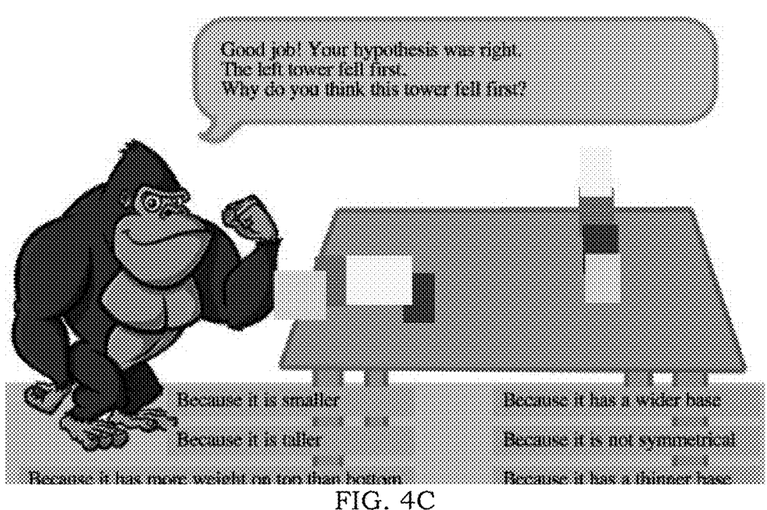

In this particular example, the towers are constructed on the table, thus creating an experimental set-up in a physical space. To create an experimental contrast, two towers of different configurations (e.g. differing shapes, heights, symmetry, center of gravity, etc.) are used. An accurate representation of the two towers as they are constructed is shown on the display 103, as shown in FIG. 4A as part of the game 113. When a user makes a selection regarding which of two towers resting on the external device 121 is more stable, the selection is entered into the computer 101 via the data input interface 111. Next, the controller 112 of the computer 101 causes the external device 121, or table in this example, to shake until at least one of the towers supported by the table collapses. The vision algorithm 110 recognizes this response to the shaking event and the controller 112 stops the external device 121 from shaking. The tower collapse is also depicted as a virtual representation on the display 103, as shown in FIG. 4C, for example.

At this point, the user is shown the results and provided an explanation of why one of the towers fell before the other. The user can also be prompted to provide a hypothesis of why one tower fell before the other. In this configuration, the game 113 is comprised of software running on the computer 101 and is a means for the system to provide feedback, solicit predictions, and otherwise provide the virtual interface for the user.

The system and method of the present invention utilize a predict/observe/explain cycle, where children are asked to make predictions about physical properties, observe outcomes of physical experiments, and explain those outcomes. Children are guided by pedagogical prompts that highlight whether or not a prediction was correct and that scaffold explanations of the actual outcome. The predict/observe/explain scaffolding sets a context in which children can construct an understanding of ideas—such as symmetry, center of mass, wide base, and height in the tower example—and how they are relevant to physical properties. Notably, children are not directly told about the physical or scientific principles or how they are relevant. They are able to discover these principles through real world feedback with pedagogical prompts on their predictions.

Figure 2:
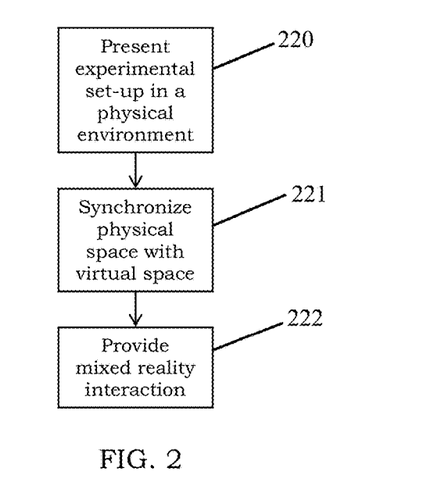
FIG. 2 is a flowchart showing a method of the invention according to one embodiment of the present invention.

FIG. 2 shows a flowchart of the basic steps of a method of the present invention. At step 220, an experimental set-up is presented to a user in a physical environment. The set-up can be presented by prompting a user construct a block tower, a pair of block towers, place objects on each side of a balance scale, or other actions where interaction with physical objects 120 occurs. Alternatively, the experimental set-up can be completed by a teacher. Once the physical set-up is presented, the physical space (i.e. area of objects 120) is synchronized with the virtual space (i.e. computer display 103 and game 113) at step 221. Referring again to the example of the block tower, the height and shape of the towers in the physical space would be represented in the virtual space on display 103 at this step. At step 222, a user interacts with the game 113, which can cause a change in the condition of the object 120 in the physical space by initiating an event. For example, a user's interaction with the game 113 can cause an external device 121 to shake the towers until one falls. The user is then presented with an explanation on the display 103 based on the outcome in the physical space, which the computer 101 recognizes.

Figure 3:
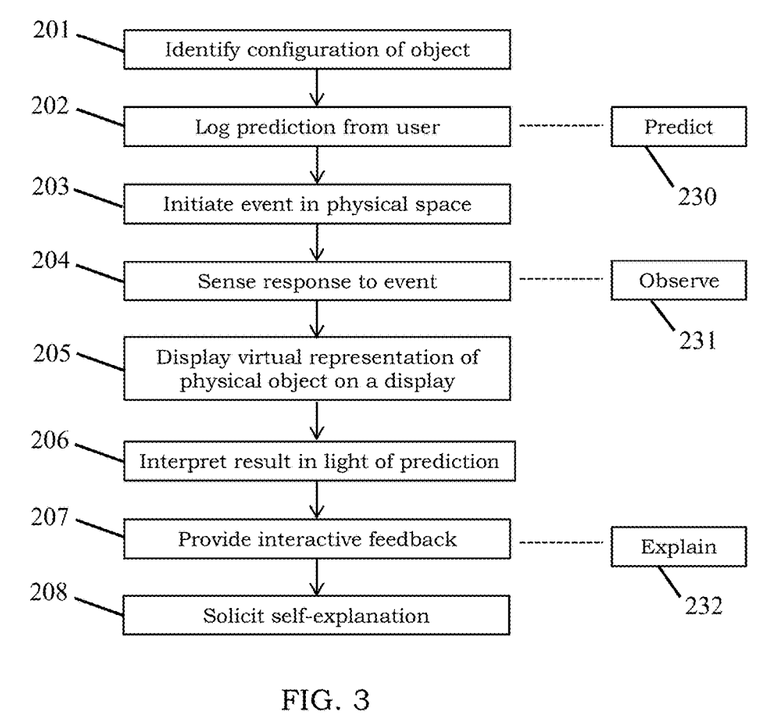
FIG. 3 is another flowchart showing additional steps in the method.

FIG. 3 shows the method of the invention according to the preferred embodiment and provides additional detail over the basic method depicted in FIG. 2. The preferred embodiment is described using a stereo camera as the sensor 102 and a pair of block towers as the physical object 120, but the invention should not be construed as limited to these examples. In FIG. 3, boxes 230, 231, and 232 show the user's experience during the process steps and are provided for illustrative purposes only.

Referring again to FIG. 3, at step 201, the object 120 presented in the experimental set-up is identified. In the preferred embodiment, the object 120 is identified by the vision algorithm 110, which processes data received from a stereo camera, or sensor 102. The object 120 can be identified as being present, or as exhibiting a certain condition. In the block tower example, the condition would be whether the tower is erect or not and how the tower is constructed. Next, a student or user enters a prediction about the object 120 at step 202. For example, the student would predict which of two towers would be the first to fall when shook. Once the prediction is entered, the system may optionally solicit an explanation from the student about their choice. The solicitation could include a prompt on the display 103 such as "Why do you think this tower will fall first? Discuss your answer with your class." A sample screenshot displayed on the display 103, which exhibits how this step of the process is presented in the game 113, is shown in FIG. 4B.

After the user has entered their prediction, an event is initiated in the physical space at step 203. In the preferred embodiment, the user is prompted to press a button or click an icon on the display 103, which causes controller 112 to commence shaking of the table, or external device 121. The prompt to shake the table as presented in the game 113 is shown in FIG. 4B. When one of the towers falls, the vision algorithm 110 recognizes this response to the shaking event at step 204. The vision algorithm is able to recognize the collapse because the tower drops below a threshold height. That is, the condition of the tower is 'collapsed.' Again, while the preferred embodiment is discussed in terms of a tower of blocks, other physical objects 120 can be used. For example, a balance scale could be used with a variety of items of similar or different weights placed on each side of the scale and a student could be asked to predict which side is heavier. The controller 112 could cause one side to be released, resulting in one side of the balance scale dropping below the other.

Once a response to an event is sensed at step 204, the table stops shaking and a virtual representation of the towers in their post-event condition is shown on the display 103 at step 205. The user is able to observe the condition of the block towers on the table and on the display 103. Next, the result is interpreted in light of the prediction at step 206. In the block tower example, the student's prediction about which tower will fall is compared to the actual results. If the student chose tower 1 and tower 1 collapsed first, they would be correct. If the student chose tower 2 and tower 1 collapse first, they would be incorrect. The student is then asked to explain why they were correct or incorrect. FIG. 4C shows an example of multiple choice options presented to a student in the context of the game 113 as to why one tower is less stable than the other. For example, one tower may have a higher center of gravity than the other, which is presented to the student as "Because it has more weight on top than bottom." These examples indirectly teach the students about the physical principles involved in the lesson. This interactive feedback provided at step 207 is critical in reinforcing the lesson. The system can also provide interactive visualizations (e.g. circling the part of the tower that has more weight or dividing the tower in two to show symmetry) to facilitate a user's understanding of the underlying principles of why their prediction was right or wrong during step 207. Optionally, a self-explanation can be solicited from the user or a group of students at step 208.

The system and method of the present invention bring together tangible objects and the virtual world. The specialized vision algorithm 110, which takes advantage of the depth and color information provided by the stereo camera used as a sensor 102 in the preferred embodiment, such as a Kinect® camera, tracks the physical objects 120 in the real world, and the computer game 113 displayed on the screen 103 gives synchronized visual and audio feedback getting input from the depth camera. The sensor 102 is not embedded in or connected to the object 120, allowing a student to arrange the object 120 in any configuration. It is not necessary for the object 120 to be arranged in a pre-determined configuration. As a result, the system provides digital interaction, while still allowing the user to construct a free-form object 120 without the typical constraints imposed by digital systems.

In one embodiment, the computer vision algorithm 110 uses color segmentation and depth information to distinguish between two towers and detect when a tower falls. Depth information is used to reliably segregate the blocks from the background (which can contain similar colors). This depth segmentation creates a mask that is used to select a subset of the color image that corresponds with the towers. Blob tracking is then used to track each segment of the colored blocks. If multiple towers are used, they can be separated by finding and merging blobs in the depth image. For towers constructed of different color blocks, the start and end of the horizontal and vertical span of each color segment in the tower is calculated by scanning the pixels, which determines the size and location of the color blobs. These color blobs are then used to provide a depiction of the live state of the blocks on the display 103.

Further, inertia of the towers based on the depth information is used to determine the shape of different towers. The inertia of each tower can be calculated by using a mathematical formula based on the distance of each pixel of the tower image from the x and y axis of the bounding box. Contour information and bounding box of the towers that students build themselves are used to determine the shape of the objects projected on the screen. Finally, falls are detected as an event when all blobs for a tower are below a minimum height above the table and when the bounding box has a height less than the minimum height. A person having ordinary skill in the art will appreciate that a variety of known computer vision algorithms can be used to detect a condition of the object 120.

The system and method of the present invention can be further understood through an overview of the game utilized in the preferred embodiment. In the preferred embodiment, the computer game 113 is presented as EarthShake™, a mixed reality game using a multimodal interactive earthquake table as the external device 121 and towers made of blocks as the physical object 120. The game 113 asks the users to make a prediction about which of the block towers on the earthquake table they think will fall first when the table shakes. When the controller 112 cause the earthquake table to shake, the users observe which tower falls first. The system, which detects which of the towers in the physical setup falls first, gives visual and audio feedback through a character in the game. The feedback provides an explanation of the principles observed by the users.

In the example of the EarthShake™ game 113, a gorilla character is used to communicate with the students, as shown in FIGS. 4A-4C. The gorilla asks the students which of the towers will fall first or if they will fall at the same time when he shakes the virtual depiction of the table. To make a prediction in response to the question from the gorilla, the students click on the tower that they think will fall first. Then the gorilla asks the users to discuss with their partner why they chose this tower and explain why they think this tower will fall first. The users make a hypothesis and discuss why they think this tower will fall first. At this stage—the predict stage—the students have not yet been presented with an explanation of the physical principles of the towers.

When they are done discussing, they click the shake button. When they click shake, the physical earthquake table starts shaking and, simultaneously, the gorilla in the game begins shaking the virtual table on the screen. When one of the towers falls, the vision algorithm 110 determines this and the gorilla gives feedback to the users. If their choice was right and the tower they had predicted falls first, he says: "Good job! Your hypothesis was right. Why do you think this tower fell first?" If they were wrong, he says: "Oh oh you were wrong! Why do you think this tower fell first?" So, the users are asked to explain the reason again. This time there are six multiple choice answers that the users can choose from to explain why they think this tower fell first. They can choose one of the following: "Because it is smaller", "Because it is taller", "Because it has more weight on top than bottom", "Because it has a wider base", "Because it is not symmetrical", "Because it has a thinner base". The multiple choice answers have spoken output on mouse-overs. The scenario can be repeated for multiple contrasting cases with different towers targeting height, wide base, symmetry, center of mass principles, and other variables that affect the stability of the tower.

Metrics can be used to determine the efficacy of the system and method. For example, in the EarthShake™ game 113 example, the earthquake table is used solely (with no projected game) and students are asked to predict which of the towers would fall first. The contrasting case items are created accordingly, having more items that target center of mass and symmetry. An explanation menu is also designed consisting of six items of explanations in children's terms (including "having more weight on top than bottom"). The students take a test to judge their level of understanding. The students then use the system with both tangible and virtual components and then take the test again. The comparison between the first test and second test provide an indication of how effective the mixed reality system is at teaching the lesson.

More specifically, the children are given paper pretest on stability and balance principles. The paper pre- and post-tests can be created taking into account the science goals listed in the NRC Framework & Asset Science Curriculum or other curriculum standards. The test includes prediction and explanation items. In the prediction items, there is a picture of a table with two towers standing on it, and the student is asked to predict what would happen when the table shook by circling one of the multiple-choice answers.

In the explanation items students are asked to explain the reason behind their answers to the prediction items.

Judging progress of the students can also be measured by testing their understanding with the physical objects. Students are given a bag of multiple blocks that stick together and the students are told to build the most stable tower they could using all the blocks, but with the constraint of using a particular block on the bottom of the tower as the base. The student's tower can then be tested on the earthquake table to see if it would fall down when the table shakes. The purpose of this activity is to assess the types of towers children built before playing with the EarthShake™ game 113. After the paper and physical pretests, children interact with the EarthShake™ game 113 for approximately thirty minutes and can target the wide base, height, center of mass and symmetry principles. For each case, they are asked to predict which tower would fall first and discuss with their partner why they thought so. Then they observe what happens in real life by shaking the table and seeing if their prediction is right or wrong Next, they are asked to explain the reason behind what they observed. After the EarthShake™ game 113 activity, they are given the bag of blocks and asked to build a tower again with the same constraints as before. Then their tower is again tested on the earthquake table side by side with the previous tower they had built to see which one stands up longer on the shaking table. Finally, they were given a paper posttest consisting of questions matched to those in the pretest.

The physicality of the EarthShake™ game 113 and the building activity play an important role to facilitate collaboration and learning. While building towers, kids are able to place blocks simultaneously, which facilitated collaboration (unlike on a computer-only based game where they would not be able to place blocks at the same time via one mouse). Students are also able to experiment with physical manipulation while building their own towers, feeling the weight and stability with their hands. Furthermore, it has been observed that children often believe what was happening more in real life than on a screen-based game.

In one example of actual use of the system by students, the children appeared to have a very natural interaction with the system. Most of them did not even realize that there was a camera in the set-up, assuming that the gorilla could in effect see the real blocks. This natural interaction is an important achievement: good technology should be there transparent to users. It reflects well on the reliability and efficiency of the vision algorithm, which detected the identity of the towers and which tower fell.

In one embodiment, bringing together the physical and virtual worlds, the EarthShake™ game 113 suggests a new kind of collaborative tangible learning. While playing with the EarthShake™ game 113, children learn to think critically by making predictions, observing direct physical evidence, formulating hypotheses by explaining their reasoning, and collaborating with others. The quantitative learning gains measured by the pre- and post-paper tests, the changes observed in the towers built before and after playing with the game, and the signs of learning captured qualitatively during the studies all suggest that the tangible system facilitates learning while also giving way to engagement and collaboration.

In alternative embodiments, the system and method are extended to different content areas to create a tangible platform usable in different contexts. In one embodiment, another tangible game, BalloonScale™, uses a similar setup as the EarthShake™ game 113 consisting of a physical balance scale and blocks integrated with a game that is projected behind the physical setup. The sensor 102, which is again a Kinect depth camera in this example, is used to determine what is going on in the real world and give synchronous feedback through the projected game. In the game scenario, first the users are asked to make a prediction about which side of the balance scale will go down when the gorillas holding up the balance scale on each side let go of the balance scale. The Kinect camera and the present inventions' specialized vision method determines which side goes down once the gorillas let go, and gives feedback about why this side went down through the projected game. In this game, Arduino is used to control the gorillas holding up the balance scale through the computer.

While this invention has been described primarily in terms of embodiments using the EarthShake™ and BalloonScale™ games 113, those skilled in the art will recognize that the system and methods of the present invention could also be used for other content areas in education. For example, some other applications include a physical cannon integrated with a game teaching projectile motion, a science game to better understand density and why certain objects sink/float, an interactive globe integrated with a game to learn about geography and connect with different cultures, physical planets moving around the sun to understand how night-day/seasons form, physical molecules that kids can build to teach them chemistry of different structures, physical organs they can build with everyday materials integrated with a computer game to teach them the biology of the human body, physical letters with sound feedback to teach reading, among others. Other content areas include forces and motion, planetary systems, climate, simple machines, animals, light and math. Also, instead of a projector, a tablet could be used as a display mounted behind the table to make the system more scalable.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of teaching using mixed reality, comprising:
presenting an experimental set-up in a physical space,
wherein the experimental set-up comprises a movable table in communication with a controller connected to a computer and an object associated with the movable table,
wherein the object comprises a plurality of towers of blocks that can exist in a plurality of physical configurations in the physical world through physical manipulation by a user, and
wherein movement of the movable table is designed to collapse at least one of the plurality of towers of blocks;
instructing the user to position the object in a first physical configuration by providing a prompt on a display screen connected to the computer;
obtaining data about the object from a sensor connected to the computer,
wherein the sensor is not connected to the object,
wherein the sensor comprises an imaging device;
identifying the first physical configuration of the object using a sensing algorithm, wherein the sensing algorithm processes the data from the sensor to identify the object and to determine a condition or property of the physical object;

displaying a virtual representation of the object in the first physical configuration on the display screen;

entering a prediction from a user about whether the first physical configuration of the object will change in response to an event;

initiating the event through the movable table,
wherein the movable table is adapted to cause the object to experience the event, thereby causing a change in the condition of at least one of the plurality of towers of blocks wherein a controller connected to the computer operates the movable table;

identifying a response of the object to the event using the sensing algorithm to process data provided by the sensor obtained after the event to detect a change in the condition or property of the physical object,
wherein identifying comprises:
retrieving data from the imaging device,
finding and merging blobs in the image data to separate each tower of the plurality of towers of blocks,
calculating an inertia of each tower by using a mathematical formula based on a distance of each pixel in the image data from an x and a y axis of a bounding box, and
determining if the tower is upright or collapsed by using a height of the bounding box;

interpreting the response of the object to the event with consideration of the prediction to determine an outcome;

displaying a virtual representation of the object after the event on the display screen; and providing interactive feedback to the user based on the outcome.

2. The method of claim 1, wherein the plurality of physical configurations are not pre-defined.

3. The method of claim 1, wherein interpreting the response of the object to the event in consideration of the prediction to determine an outcome comprises:
comparing the virtual representation of the first physical configuration with the virtual representation of the post-event physical configuration of the object to determine if the object changed physical configurations to assign an event result, wherein the virtual representation is derived by the sensing algorithm;
comparing the prediction with the event result; and
determining whether the prediction was correct or incorrect.

4. The method of claim 1, wherein the response of the object to the event comprises:
a change from the first physical configuration to another physical configuration.

5. The method of claim 1, further comprising:
prompting the user to provide a self-explanation after seeing the outcome.

6. The method of claim 1, further comprising:
providing a second object, wherein the second object can exist in a plurality of physical configurations through physical manipulation by the user;
positioning the object in a second physical configuration; and
comparing the response of the first object to the event to the response of the second object to the event.

7. The method of claim 1, further comprising:
assessing a trait of the object using the sensing algorithm, wherein the trait is based at least in part on the configuration of the object.

8. The method of claim 7, wherein the trait is selected from the group consisting of:
height, center of gravity, base width, and symmetry.

9. The method of claim 1, further comprising:
administering a test to the user prior to the event and collecting first results;
administering the test to the user subsequent to collecting the first results and collecting second results; and
comparing the first results to the second results to determine a progression of the user.

10. The method of claim 1, wherein the experimental setup comprises an experimental contrast having a plurality of differing objects.

11. The method of claim 1, further comprising:
providing interactive visualizations on the display to provide an explanation of principles relating to the outcome.

* * * * *